United States Patent
Fujita

(10) Patent No.: US 9,836,799 B2
(45) Date of Patent: Dec. 5, 2017

(54) SERVICE PROVISION PROGRAM

(71) Applicant: FUJITSU LIMITED, Kawasaki-shi, Kanagawa (JP)

(72) Inventor: Sokichi Fujita, Chiyoda (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/750,205

(22) Filed: Jun. 25, 2015

(65) Prior Publication Data

US 2016/0005177 A1 Jan. 7, 2016

(30) Foreign Application Priority Data

Jul. 2, 2014 (JP) .................................. 2014-136746

(51) Int. Cl.

| | |
|---|---|
| *G06T 17/00* | (2006.01) |
| *G06Q 50/00* | (2012.01) |
| *G06T 19/20* | (2011.01) |
| *G06T 15/50* | (2011.01) |
| *G06Q 30/02* | (2012.01) |
| *G06T 15/04* | (2011.01) |

(Continued)

(52) U.S. Cl.
CPC ............ *G06Q 50/01* (2013.01); *G06K 9/6255* (2013.01); *G06Q 30/0269* (2013.01); *G06T 15/04* (2013.01); *G06T 15/506* (2013.01); *G06T 19/20* (2013.01); *G06K 9/344* (2013.01); *G06T 17/00* (2013.01); *G06T 17/005* (2013.01); *G06T 17/10* (2013.01); *G06T 17/20* (2013.01); *G06T 19/00* (2013.01); *G06T 2219/2016* (2013.01)

(58) Field of Classification Search
CPC ......... G06T 17/20; G06T 19/20; G06T 19/00; G06T 17/00; G06T 17/10; G06T 17/005; G06T 7/0081; G06T 15/04; G06T 15/506; G06K 9/0263; G06K 9/344; G06Q 30/0269; G06Q 50/01
See application file for complete search history.

(56) References Cited

U.S. PATENT DOCUMENTS

| | | | |
|---|---|---|---|
| 7,246,085 B2 * | 7/2007 | Kamon ................ | G06Q 10/087 345/660 |
| 7,683,900 B2 * | 3/2010 | Chang .................... | G06T 15/20 345/419 |

(Continued)

FOREIGN PATENT DOCUMENTS

| | | |
|---|---|---|
| JP | 5-236341 | 9/1993 |
| JP | 9-322151 | 12/1997 |

(Continued)

OTHER PUBLICATIONS

Patent Abstracts of Japan, Publication No. 2009-284234, published Dec. 3, 2009.

(Continued)

*Primary Examiner* — Abderrahim Merouan
(74) *Attorney, Agent, or Firm* — Staas & Halsey LLP

(57) ABSTRACT

A non-transitory recording medium storing a program that causes a computer to execute a process, the process including: generating a modified image by executing modification processing on an image of a mark affixed to a product; and providing the generated modified image as a determination-use image employable in determination as to whether or not the product affixed with the mark is included in a captured image.

14 Claims, 13 Drawing Sheets

(51) Int. Cl.
*G06K 9/62* (2006.01)
*G06T 17/20* (2006.01)
*G06K 9/34* (2006.01)
*G06T 17/10* (2006.01)
*G06T 19/00* (2011.01)

(56) References Cited

U.S. PATENT DOCUMENTS

| | | | |
|---|---|---|---|
| 8,004,576 B2* | 8/2011 | Sharma | G06K 9/4642 348/222.1 |
| 8,606,645 B1* | 12/2013 | Applefeld | G06Q 30/02 705/14.25 |
| 8,861,864 B2* | 10/2014 | Hong | G06K 9/4671 382/154 |
| 9,122,706 B1* | 9/2015 | Holzschneider | G06F 17/30256 |
| 9,226,043 B2* | 12/2015 | Rodriguez Marchant | H04L 9/28 |
| 9,275,278 B2* | 3/2016 | Liu | G06K 9/00442 |
| 2009/0089175 A1* | 4/2009 | Platek | G06Q 10/08 705/26.1 |
| 2009/0295948 A1 | 12/2009 | Oishi | |
| 2010/0095326 A1* | 4/2010 | Robertson, III | G11B 27/28 725/40 |
| 2010/0103481 A1* | 4/2010 | Morimoto | G06K 9/3208 358/474 |
| 2011/0007974 A1* | 1/2011 | Ai | G06K 9/00221 382/201 |
| 2011/0129155 A1* | 6/2011 | Oami | G06K 9/629 382/195 |
| 2011/0222774 A1* | 9/2011 | Hong | G06K 9/4671 382/190 |
| 2012/0269439 A1* | 10/2012 | Yang | G06K 9/6857 382/190 |
| 2013/0170695 A1* | 7/2013 | Anan | G06T 1/0021 382/100 |
| 2013/0226711 A1* | 8/2013 | Wu | G06Q 30/02 705/14.69 |
| 2014/0016817 A1* | 1/2014 | Nakagata | H04N 19/467 382/100 |
| 2014/0132578 A1* | 5/2014 | Zheng | G09G 5/10 345/207 |
| 2014/0270531 A1* | 9/2014 | Nakagata | G06K 9/00758 382/191 |
| 2014/0312234 A1* | 10/2014 | Tan | G01J 1/4228 250/349 |
| 2014/0313223 A1* | 10/2014 | Koga | G09G 5/377 345/629 |
| 2015/0003736 A1* | 1/2015 | Choi | G06K 9/6217 382/190 |
| 2015/0049487 A1* | 2/2015 | Connor | F21V 33/0076 362/277 |
| 2015/0110413 A1* | 4/2015 | Eronen | G11B 27/034 382/254 |
| 2015/0134492 A1* | 5/2015 | Harrison | G06F 3/04845 705/27.2 |

FOREIGN PATENT DOCUMENTS

| | | |
|---|---|---|
| JP | 2002-123830 | 4/2002 |
| JP | 2006-129519 | 5/2006 |
| JP | 2008-52598 | 3/2008 |
| JP | 2009-284234 | 12/2009 |

OTHER PUBLICATIONS

Patent Abstracts of Japan, Publication No. 5-236341, published Sep. 10, 1993.
Patent Abstracts of Japan, Publication No. 2002-123830, published Apr. 26, 2002.
Patent Abstracts of Japan, Publication No. 9-322151, published Dec. 12, 1997.
Patent Abstracts of Japan, Publication No. 2006-129519, published May 18, 2006.
Patent Abstracts of Japan, Publication No. 2008-52598, published Mar. 6, 2008.

* cited by examiner

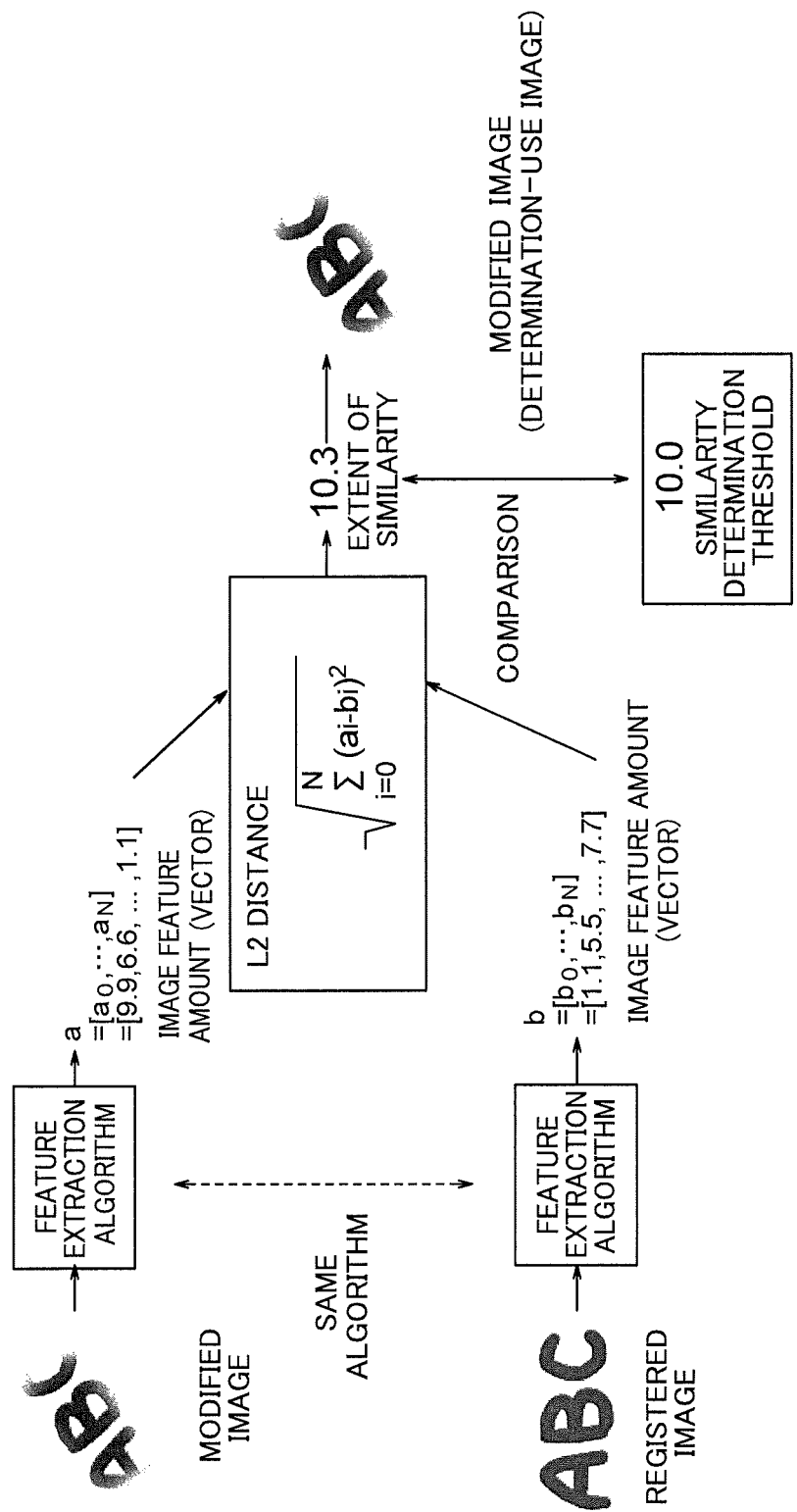

FIG.4

```
// DOCUMENT DATABASE STRUCTURE
{
  id:'cp123455555', // DB PRIMARY KEY
  created: 20150710115500, // TIME OF STORAGE IN DB
  user:
  {
    id:'eu10249810', // USER ID
    name:'Sokichi Fujita' // USER NAME
  },
  tag: // INFORMATION (TAG) OF IMAGED OBJECT
  {
    id: 'ns22334455', // OBJECT ID
    name: 'juicelogo' // OBJECT TITLE
  },
  feature: [9.9,6.6,3.3,···,1.1], // FEATURE VECTORS USED IN EXTENT OF SIMILARITY CALCULATION
  extractor: // ALGORITHM USED IN FEATURE EXTRACTION
  {
    id: 'ex001', // ID OF ALGORITHM USED IN FEATURE EXTRACTION
    name: 'BRISK', // NAME OF ALGORITHM USED IN FEATURE EXTRACTION
  },
  matcher: // ALGORITHM USED IN MODIFIED IMAGE DETERMINATION
  {
    id: 'mt001', // ID OF ALGORITHM USED IN REFERENCE IMAGE DETERMINATION
    name: 'l2', // NAME OF ALGORITHM USED IN REFERENCE IMAGE DETERMINATION
    threshold: 10, // THRESHOLD VALUE OF REFERENCE IMAGE DETERMINATION
  },
  effects: ['ef0001'], // LIST OF APPLIED EFFECTS.
  url: ['https://example.com/···/1234.jpg'] // IMAGE STORAGE LOCATION
  :
}
```

DETERMINATION-USE IMAGE A

ABC

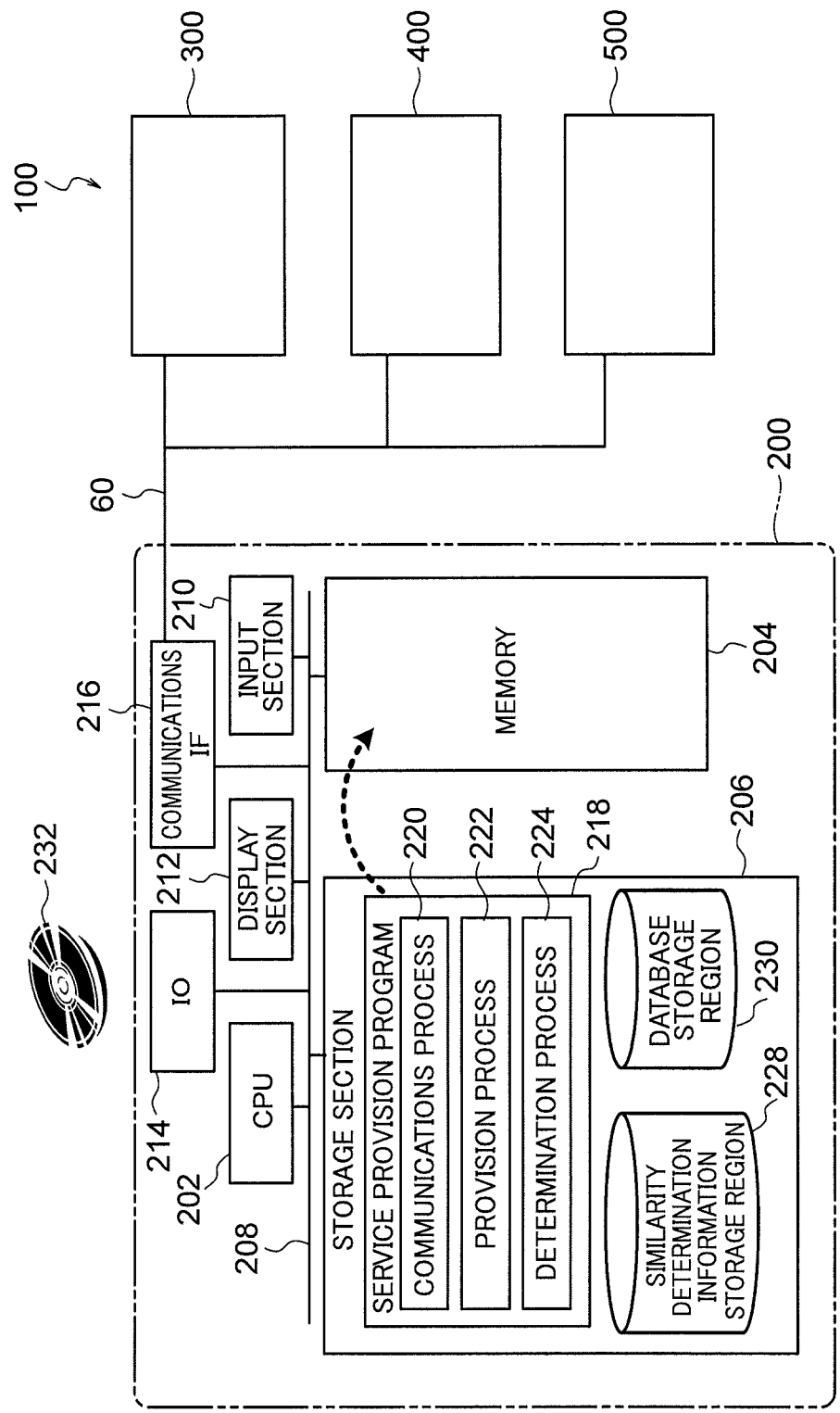

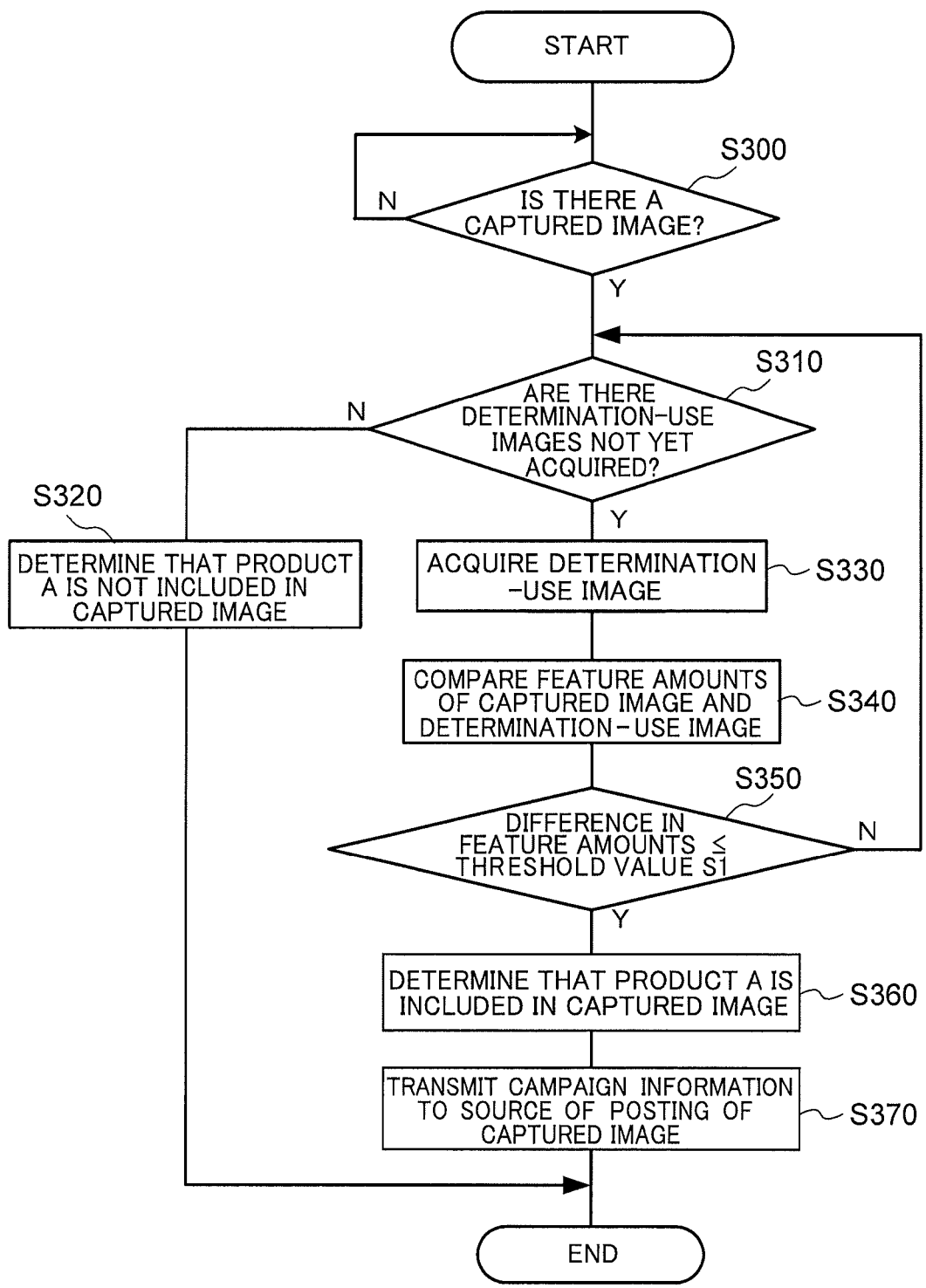

SERVICE PROVISION PROGRAM

CROSS-REFERENCE TO RELATED APPLICATION

This application is based upon and claims the benefit of priority of the prior Japanese Patent Application No. 2014-136746, filed on Jul. 2, 2014, the entire contents of which are incorporated herein by reference.

FIELD

The embodiments discussed herein are related to a service provision program.

BACKGROUND

Recently, development is progressing in methods for executing image processing on images captured by cameras and the like, automatically detecting the occurrence of situations that differ from normal in the captured image, and determining whether or not a specific subject is included in the captured image. Such image determinations generally employ a method of comparing a feature amount in a captured image and in an image of the subject serving as a reference for determination (determination-use image).

However, for example, for captured images such as those captured outside, the image capture conditions of the captured image sometimes differ from the image capture conditions of the determination-use image, such as by changes in the brightness of light illuminating the subject to be determined. The detection precision and the precision of determination of the subject are therefore lowered in abnormal situations.

Hitherto, reference data for feature amounts of the captured images have therefore first been obtained from a relationship between predetermined brightness data and a feature amount of the captured image, based on brightness data of the captured images. A monitoring device has been proposed that then automatically detects the occurrence of situations that differ from normal captured images, even if the captured image is captured in conditions of changed illumination, by comparing the difference between obtained reference data and the feature amount obtained from the captured image.

RELATED PATENT DOCUMENTS

Japanese Patent Application Laid-Open (JP-A) No. H09-322151

SUMMARY

According to an aspect of the embodiments, a program generates a modified image by executing modification processing in a computer on an image of a mark affixed to a product. The program executes to provide the generated modified image as a determination-use image employable in determination as to whether or not the product affixed with the mark is included in a captured image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of processing that determines image similarity.

FIG. 4 is a diagram illustrating an example of a database structure for a determination-use image.

FIG. 5 is a diagram illustrating an example of a service provision device implemented by a computer.

FIG. 13 is a flowchart illustrating an example of a flow of determination processing of a service provision system according to the second exemplary embodiment.

DESCRIPTION OF EMBODIMENTS

Detailed explanation follows regarding an example of an exemplary embodiment according to technology disclosed herein, with reference to the drawings.

Recently, social networking services (SNS) that share information between somewhat interlinked communities are being extensively used as a community instrument for individuals and corporations. In SNS, information is spread within a community using text, images, audio, etc., and this is becoming recognized as an important advertising medium for corporate enterprises. At the same time, opportunities are increasing to implement campaigns using SNS and aimed at promoting sales of products.

In the present exemplary embodiment, an example of a system is explained that determines whether or not a product sold by a given manufacturer is included in an image when, for example, a user posts an image captured of the product to the SNS, and then provides a gift or the like to the user that posted the image including the product. Although the type of product made the subject of a campaign is not limited, explanation follows of an example in which a product A that is a canned drink sold by a drinks manufacturer serves as the product subject to a campaign.

Figure 1:
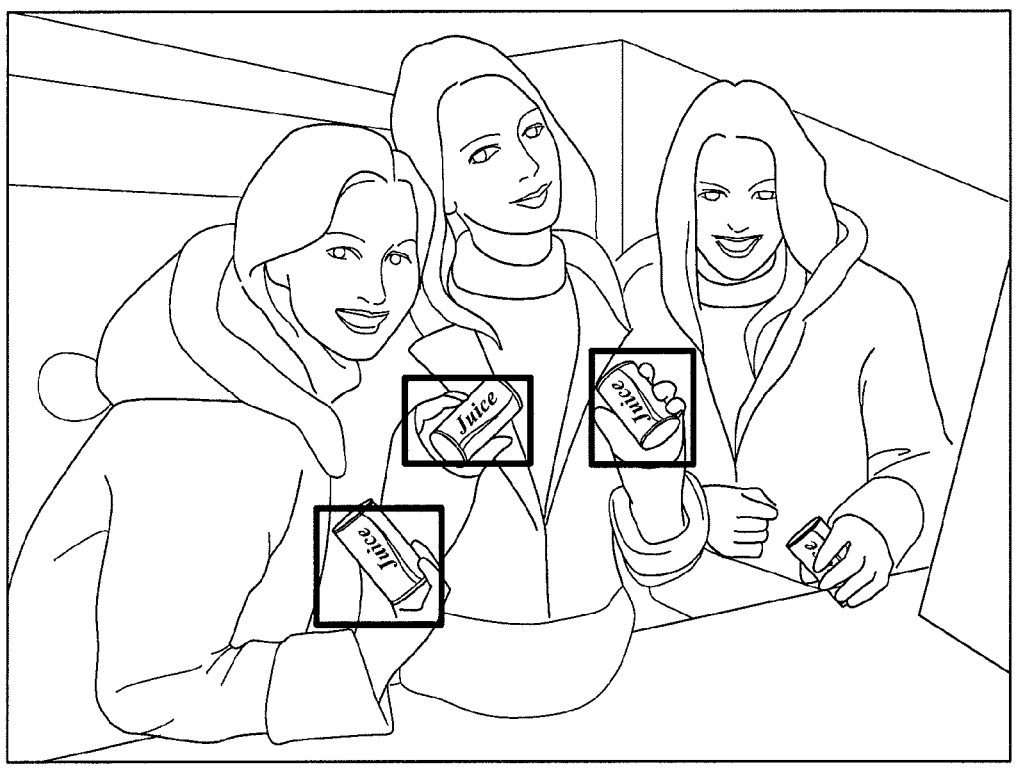
FIG. 1 is a diagram illustrating an example of a captured image.

In implementing such a campaign, there is a need to determine whether or not a mark representing the product A is included in a captured image posted to an SNS by a user, such as that illustrated in FIG. 1. As is apparent from FIG. 1, the product A is sometimes captured from various angles, and since the mark of the product A is displayed along the side face of the can, imaging sometimes takes place without the whole mark being imaged due to actions such as holding the can in the hand, resulting in a state in which a portion of the mark is omitted.

Moreover, when, for example, a drinks manufacturer also provides gifts to users who post images to an SNS depicting an advertising flag displaying a mark of the product A, the mark of the product A will sometimes be imaged in a warped state since the shape of the flag changes under the influence of, for example, the wind. Such warping of the mark also sometimes occurs when the lens of the camera that captured the image is mounted with a wide-angle lens or a fisheye lens.

Since various states are imaged in this manner even for the same mark, it is often difficult to determine whether or not the mark of the product A is included in the captured image.

Although the product A is surrounded by a rectangle to make the position of the product A in the captured image clear in the example of FIG. 1, there is no rectangle surrounding the product A in the captured image posted to the SNS by the user. The mark discussed here may be any mark as long as it is a mark representing the product A, such as a mark identifying the manufacturer of that sells the product A, a mark identifying the product A, or a campaign mark. The mark may be text, may be a graphic design, or may be a single mark in which text and a graphic design are combined.

Recently, software capable of processing captured images in various ways is being provided in information devices such as smart phones, and opportunities are therefore increasing for users to post captured images that have been image processed on SNSs.

Image processing includes various processes performed on an original captured image, such as image rotation, resizing, color modification, image blurring, background elimination, and effect processing that enhances a specific impression by changing the impression of an image. Note that image blurring is also known as airbrushing.

Specific examples of effect processing include processing that processes an image into a comic book style by outline extraction, and processing that processes an image into a toy camera style by blurring the whole image, making the brightness of the peripheral portions of the image lower than the brightness of an image center portion, and setting the saturation and contrast higher than the actual values. Other examples of effect processing include various image processes performed in order to draw out a specific impression effect, such as vintage styling that processes a sepia tone image to give an impression of passage of time, and processing in which an image is processed into a pop art style that emphasizes contrast differences.

Thus even if a captured image includes the mark of the product A, it is often difficult to determine whether or not the mark of the product A is included in the captured image when image processing has been performed on the captured image.

Hence the following exemplary embodiment explains a system that generates determination-use images for determining with high precision whether or not a predetermined subject is included in various captured images in which capture conditions may differ, and on which image processing may have been performed.

First Exemplary Embodiment

Figure 2:
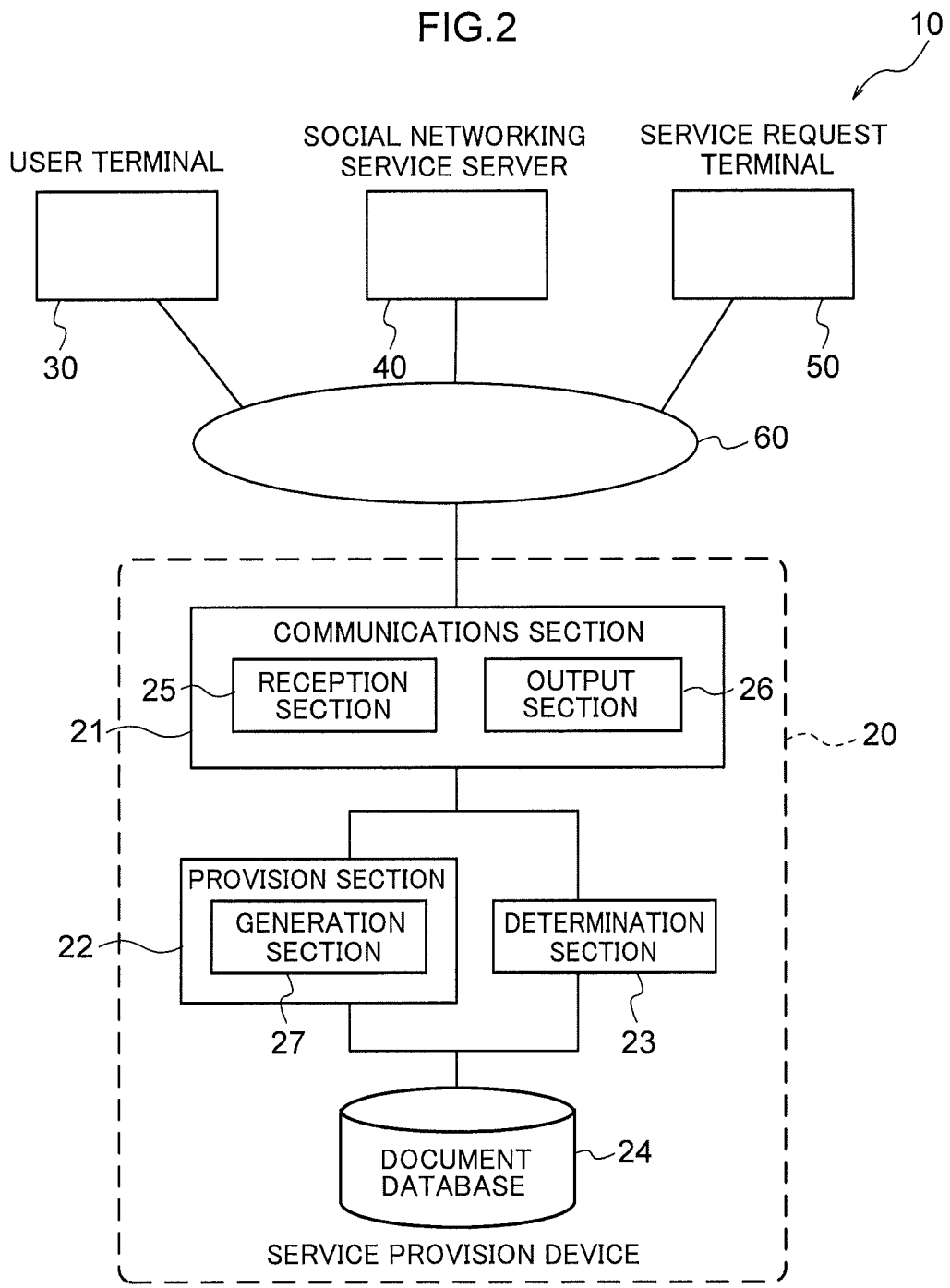
FIG. 2 is a diagram illustrating an example of a service provision system.

FIG. 2 is a diagram illustrating an example of a service provision system 10 according to an exemplary embodiment.

The service provision system 10 is a system in which a service provision device 20, a user terminal 30, a social networking service server 40 (referred to as SNS server 40 hereafter), and a service request terminal 50 are connected to one another through a communication line 60. Note that although the communication line 60 according to the present exemplary embodiment is an internet line in the following explanation, the type of the communication line 60 is not limited thereto. For example, the communication line 60 may be a dedicated line, or may be an intranet such as a company-wide LAN. The architecture of the communication line 60 may be formed using any out of wires, wireless, or a mixture of wires and wireless.

The user terminal 30 is a terminal that posts captured images of the product A taken by the user to an SNS. The user terminal 30 is, for example, a personal computer (PC), a notebook PC, a tablet terminal, or a smartphone, and may be any information device that includes a function for sending captured image data to the SNS server 40 through the communication line 60.

The SNS server 40 is a server that stores captured images sent from the user terminal 30, and manages the publication destination and the like of the captured image based on a security policy set by the user who sent the captured image.

The service request terminal 50 is, for example, installed at the drinks manufacturer implementing the campaign for the product A, and exchanges information needed in the campaign for the product A with the service provision device 20 described below. A browser pre-installed to the service request terminal 50 may be employed for data exchange with the service provision device 20, or a dedicated application provided by the administrator managing the service provision device 20 may be employed. The installation location of the service request terminal 50 is not limited to within the corporate entity implementing the campaign, and it goes without saying that the service request terminal 50 may be installed at any location depending on the situation.

The user terminal 30, the SNS server 40, and the service request terminal 50 may each have plural connections to the communication line 60.

The service provision device 20 includes a communications section 21, a provision section 22, a determination section 23, and a document database 24. The document database 24 is simply referred to as database 24 hereafter.

The communications section 21 connects the service provision device 20 to the communication line 60, and exchanges the data that is needed with information devices such as the user terminal 30, the SNS server 40, and the service request terminal 50.

Specifically, the communications section 21 includes a reception section 25 and an output section 26. The reception section 25 receives data from the user terminal 30, the SNS server 40, and the service request terminal 50. The output section 26 outputs data included in the service provision device 20 as necessary to the user terminal 30, the SNS server 40, and the service request terminal 50.

For example, the drinks manufacturer transmits images of the mark of the product A from the service request terminal 50 to the reception section 25 of the service provision device 20 over the communication line 60 in preparation for the campaign for the product A. Images of the mark of the product A transmitted to the service provision device 20 from the service request terminal 50 are referred to as "registered images" to distinguish them from other images. The registered images transmitted from the service request terminal 50 to the service provision device 20 may be either still images or video. The registered images in the present exemplary embodiment are still images as an example.

The reception section 25 is capable of receiving from the service request terminal 50 information related to the product A such as the color, size, shape, material, and applications of the product A, and additional information including instructions for modification processing to be executed on the registered images. The shape of the product A is information indicating, for example, whether the shape of the product A appears spherical or cylindrical when viewed. The material of the product A is information indicating whether the surface of the product A is, for example, metallic or plastic. The applications of the product A is information related to, for example, situations for using the product A, such as content related to main locations for usage, main time periods of usage, and portability, indicating whether or not the product A can be carried. The instructions for modification processing to be executed on the registered images are, for example, instructions for image processing such as blurring processing or background elimination to be executed on the registered images.

The service request terminal 50 does not need to transmit every item of additional information mentioned above to the reception section 25. For example, the service request terminal 50 may transmit just the shape of the product A to the reception section 25.

The provision section 22 includes a generation section 27. The generation section 27 generates modified images by executing modification processing on the registered images received by the reception section 25.

Specifically, the generation section 27 includes in advance various image processing algorithms for executing image rotation, resizing and the like, and for example, generates modified images of the registered images by executing image processing on the registered images based on the additional information received by the reception section 25.

The generation section 27 then uses a known feature extraction algorithm to calculate feature amounts of the registered images and of the generated modified images.

Binary Robust Invariant Scalable Keypoints (BRISK) is employed as an example of a feature extraction algorithm in the generation section 27 according to the present exemplary embodiment; however, the feature extraction algorithm employed by the generation section 27 is not limited thereto. For example, when additional information is received indicating that the product A is often used in a tilted state, a feature extraction algorithm that excels in extracting features of images including objects that are tilted may be employed.

Note that BRISK is a feature extraction algorithm in which scale invariability and rotation invariability are introduced to Binary Robust Independent Elementary Features (BRIEF), which are focused on differences in luminance between two separated points of an image. BRISK extracts feature amounts from images having modified scale and rotation with higher precision than Scale Invariant Feature Transform (SIFT) or Speeded Up Robust Feature (SURF) that are typical feature extraction algorithms for extracting from images feature amounts that are invariant on scaling and rotation.

FIG. 3 is a diagram illustrating an example of processing that determines the similarity between the registered images and modified images processed by the generation section 27, based on the feature amounts extracted from each of the registered images and the modified images.

A feature amount a of a modified image extracted using a feature extraction algorithm is expressed as a vector quantity $\hat{a}=[a0, \ldots, aN]$, and a feature amount b of a registered image prior to modification processing is expressed as a vector quantity $\hat{b}=[b0, \ldots, bN]$. Herein, N+1 ($0 \leq N < \infty$) represents the dimensionality of the feature amount, and the $\hat{\ }$ symbol denotes a vector.

The generation section 27 calculates distances between extracted feature amounts extracted from two respective images, and determines that the registered image and the modified image are similar images when the value of the calculated distance is a predetermined threshold value (similarity determination threshold value S1) or lower. In the generation section 27 according to the present exemplary embodiment, for example, the Euclid distance, as expressed by L2 distance indicated in Equation (1), is employed as a distance of feature amounts representing image similarity.

$$dL_2(\hat{a}, \hat{b}) = \sqrt{\sum_{i=0}^{N}(a_i - b_i)^2} \quad (1)$$

Herein, $dL_2(\hat{a}, \hat{b})$ denotes an L2 distance between the feature amount a and the feature amount b. Accordingly, the similarity between the registered image and the modified image increases as the value of $dL_2(\hat{a}, \hat{b})$ decreases.

The determination of similarity between images is not limited to methods employing the L2 distance. For example, the similarity between the registered image and the modified image may be determined by mapping feature amounts extracted from each image at feature points, which are at locations to which feature extraction was applied, to vector space, and then comparing the vector distribution of the feature points of each image using statistical methods, machine learning, or the like.

Any indicator capable of quantitatively indicating the extent of similarity between images, such as the distance Lp indicated in Equation (2), may be employed in the determination of extent of similarity between images.

$$dL_2(\hat{a}, \hat{b}) = \left(\sum_{i=0}^{N}|a_i - b_i|^p\right)^{\frac{1}{p}} \quad (2)$$

Herein, $dL_p(\hat{a}, \hat{b})$ denotes a distance Lp between the feature amount a and the feature amount b.

When the calculated L2 distance is the similarity determination threshold value S1 or less, namely, when the registered image and the modified image are similar, the generation section 27 then performs image processing on the registered image until the registered image and the modified image are no longer similar.

However, when the calculated L2 distance is greater than the similarity determination threshold value S1, namely, when the registered image and the modified image are dissimilar, the generation section 27 ends modification processing on the registered image.

The generation section 27 thereby generates modified images such that the differences in feature amount of the respective images from the registered images are more than the similarity determination threshold value S1.

The provision section 22 stores the modified images generated by the generation section 27 in the database 24, described below, as determination-use images employable in the determination as to whether or not the product A affixed with the mark represented by the registered images is included in the captured image posted to the SNS server 40 by the user, and provides the determination-use images to the determination section 23.

The determination-use image for the product A that was provided by the provision section 22 is stored in the database 24. The database 24 employs a document database, typically MongoDB for example. MongoDB is a document database that includes plural documents in respective collections, and can define freely selected fields for each document according to the structure and data format of the determination-use image. MongoDB is a database applied for management of so-called big data, in which database distribution as the amount of stored determination-use images increases is relatively simple compared to in a conventional relational database (RDB).

FIG. 4 is a diagram illustrating an example of a database structure a determination-use image. Note that any text following "//" in FIG. 4 is a comment explaining the content of the corresponding field.

The database 24 according to the present exemplary embodiment includes, for example, a primary key, a time of storage, photographer information, information regarding the imaged object, information regarding the feature extraction algorithm, the feature amount in the image, the determination algorithm of the modified image generation, information regarding effects applied to the image, image storage location, and the like.

Although the database 24 according to the present exemplary embodiment employs MongoDB in order to store determination-use images, the employed database is not limited thereto, and other types of databases may be employed. Moreover, a known file system such as the NT File System (NTFS) may be employed without employing a database.

The reception section 25 receives captured images posted to the SNS server 40 during the campaign period for the product A.

The determination section 23 receives captured images from the reception section 25 and extracts feature amounts from the captured images using the same feature extraction algorithm as the generation section 27. The determination section 23 then, for example, calculates an L2 distance indicating the extent of similarity of the image from the feature amounts of the captured image and the feature amounts of the determination-use images of the product A stored in the database 24 using Equation (1). The determination section 23 then determines whether or not the product A affixed with the mark represented by the registered images is included in the captured image by comparing the calculated L2 distance and the similarity determination threshold value S1.

According to the determination result made by the determination section 23, the output section 26 outputs an email or the like containing information related to the campaign for the product A, such as a URL link to an application form for a gift, to the user who posted the captured image including the product A for example. The reception section 25 may acquire the captured image managed by the SNS server 40, and information such as an email address specifying the provider of the captured image, using application programming interfaces (API) pre-prepared for each SNS service.

FIG. 5 illustrates a computer system 100 as a computer implementable example of the service provision device 20, the user terminal 30, the SNS server 40, and the service request terminal 50 included in the service provision system 10.

The computer system 100 illustrated in FIG. 5 as the service provision system 10 includes a computer 200 as the service provision device 20. The computer system 100 also includes a computer 300 as the user terminal 30, a computer 400 as the SNS server 40, and a computer 500 as the service request terminal 50.

The computer 200 includes a CPU 202, memory 204, and a nonvolatile storage section 206. The CPU 202, the memory 204, and the nonvolatile storage section 206 are connected to one another through a bus 208. The computer 200 includes an input section 210 such as a keyboard and mouse, and a display section 212 such as a display. The input section 210 and the display section 212 are connected to the bus 208. The computer 200 also includes an IO 214 for reading/writing from/to a recording medium 232, and the IO 214 is connected to the bus 208. The computer 200 also includes a communications interface (IF) as an interface for connecting to the communication line 60, and the communications IF 216 is also connected to the bus 208. The storage section 206 may be implemented by a hard disk drive (HDD), flash memory, or the like.

A service provision program 218 that causes the computer 200 to function as the service provision device 20 illustrated in FIG. 2, a similarity determination information storage region 228, and a database storage region 230 are stored in the storage section 206. The service provision program 218 stored in the storage section 206 includes a communications process 220, a provision process 222, and a determination process 224.

The CPU 202 reads the service provision program 218 from the storage section 206, expands the service provision program 218 into the memory 204, and executes each process included in the service provision program 218. The CPU 202 expands similarity determination information included in the similarity determination information storage region 228 into the memory 204 as the similarity determination threshold value S1. The CPU 202 expands information for configuring a database included in the database storage region 230 into the memory 204, and configures the database 24.

The computer 200 operates as the service provision device 20 illustrated in FIG. 2 by the CPU 202 reading the service provision program 218 from the storage section 206, expanding the service provision program 218 into the memory 204, and executing the service provision program 218. The computer 200 operates as the communications section 21 including the reception section 25 and the output section 26 illustrated in FIG. 2 by the CPU 202 executing the communications process 220. The computer 200 operates as the provision section 22 included in the generation section 27 illustrated in FIG. 2 by the CPU 202 executing the provision process 222. The computer 200 operates as the determination section 23 illustrated in FIG. 2 by the CPU 202 executing the determination process 224.

Note that the service provision device 20 may also be implemented by, for example, a semiconductor integrated circuit, and more specifically by an application specific integrated circuit (ASIC), or the like.

Next, explanation follows regarding operation of the service provision device 20 according to the present exemplary embodiment. When determination-use images of the product A are not stored in the database 24, the service provision device 20 according to the present exemplary embodiment executes determination-use image generation processing.

Figure 6:
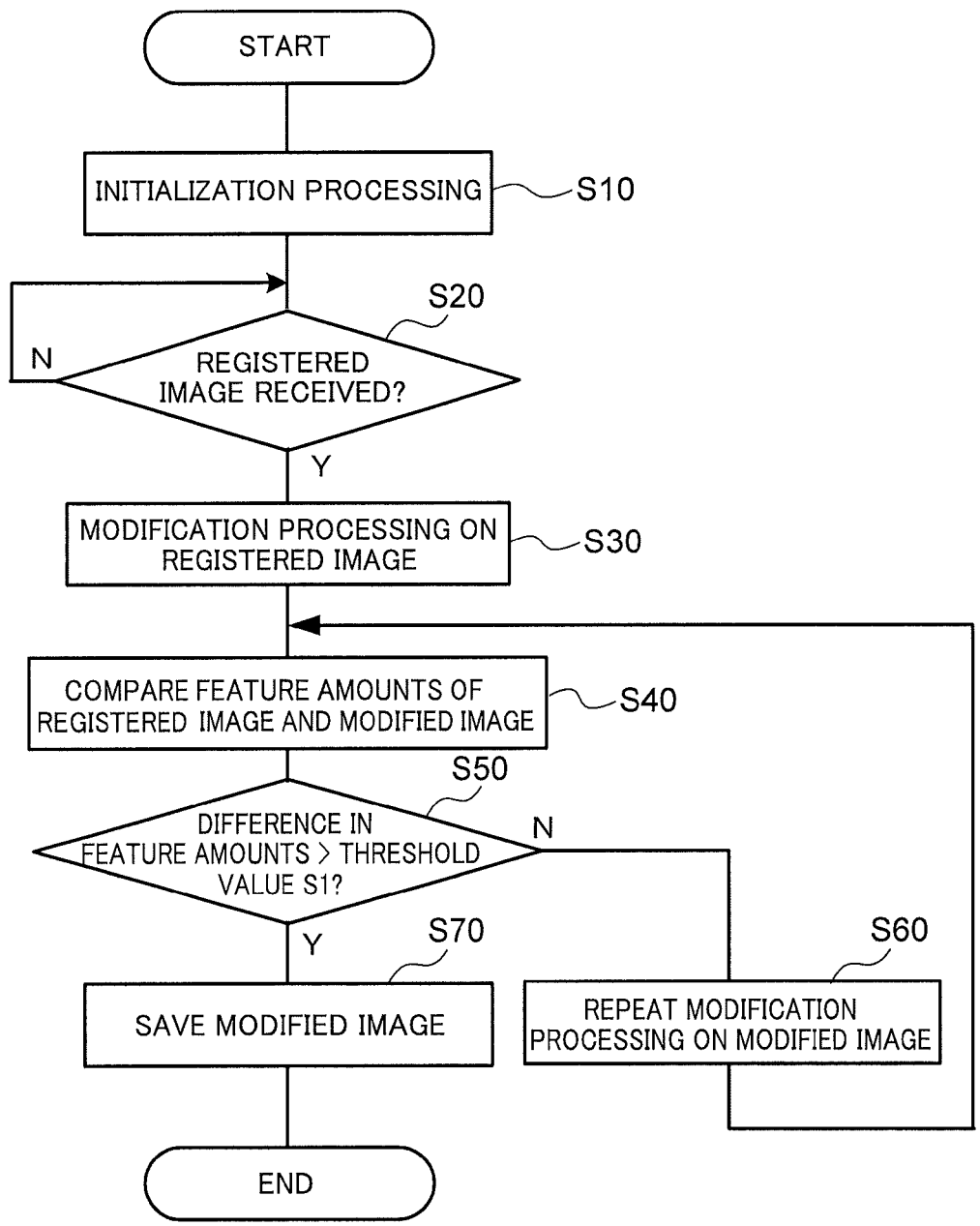
FIG. 6 is flowchart illustrating an example of a flow of determination-use image generation processing of a service provision system according to a first exemplary embodiment.

FIG. 6 is a flowchart illustrating an example of a flow of the determination-use image generation processing according to the present exemplary embodiment.

First, at step S10, initialization processing that is needed to execute the determination-use image generation processing is executed. Specifically, the generation section 27 acquires the similarity determination threshold value S1 expanded in to the memory 204.

At step S20, the reception section 25 determines whether or not the registered images of the product A were received from service request terminal 50. In cases of negative determination, processing of step S20 is repeated until the registered images are received. In cases of affirmative determination, the received registered images and reproductions of the registered images are stored in a predetermined region in the memory 204. When additional information is appended to the registered images, the reception section 25 also associates the registered images with the additional information, and stores the registered images and the additional information in a predetermined region in the memory 204.

At step S30, the generation section 27 executes modification processing on the registered images received in the processing of step S20. In cases in which there is additional information associated with the registered images, the content of the modification processing executed on the registered images is determined based on the content of the additional information.

For example, in a case of additional information indicating that the product A is cylindrical in shape, has metal as the material, is carried in the hand, and is mainly used outdoors, the generation section 27 determines that the mark of the product A tends to be imaged in a state in which a portion thereof is omitted since the product A is cylindrical in shape and is used while being held. The generation section 27 also determines that the mark of the product A tends to be imaged in a state in which light is reflected since the additional information indicates that the material of the product A is metal, and the product A is mainly used outdoors.

As a result of the above determination, the generation section 27 performs image processing on the registered images received in the processing of step S20 such that the registered images appear to be curved along the side face of a cylinder, and have a portion thereof omitted. The generation section 27 then performs further effect processing on the registered images on which image processing has been performed, to produce a hue and brightness corresponding to being in sunlight.

The generation section 27 is provided in advance with a correspondence table stipulating correspondences between content specified by the additional information, and modification processing to be executed on the registered images when content is specified. The generation section 27 determines the contents of the modification processing to be executed on the registered images by referencing the correspondence table. There are no limitations to the content of the modification processing executed on the registered images by the generation section 27, and various known modification processing may be executed.

For example, the brightness and hue of the product A change as the amount of light and the wavelength of the light illuminating the product A change with the type of light source illuminating the product A. Therefore the weather during image capture, or the type of light source, such as sunlight, a fluorescent light, or a candle, is sometimes specified in the additional information. In such cases, the generation section 27 references the correspondence table, and performs modification processing corresponding to the light source that illuminates the surroundings of the product A, namely, corresponding to information related to an ambient light source, on the registered images.

Figure 7:
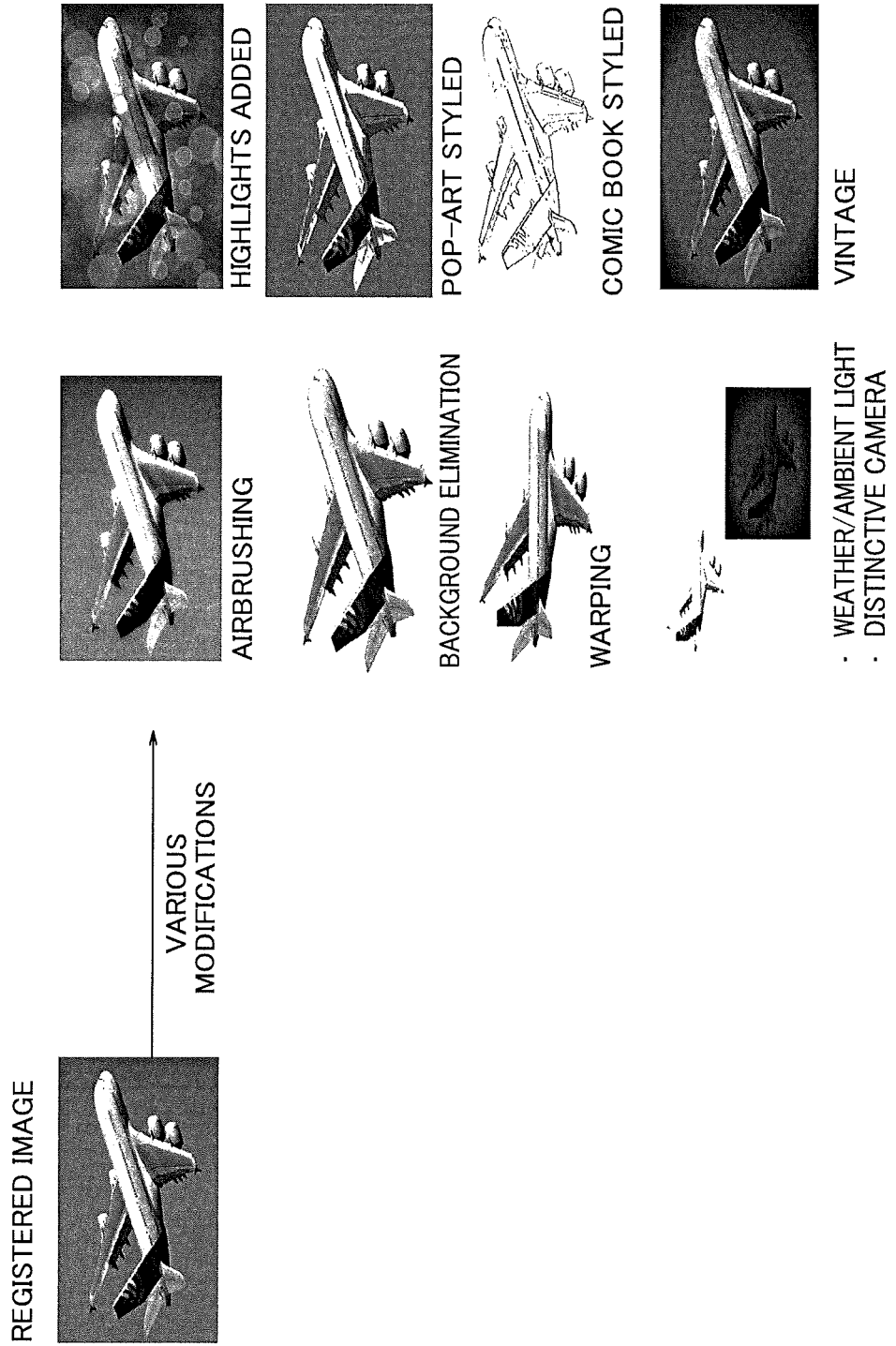
FIG. 7 is a diagram illustrating an example of modification processing.

FIG. 7 is a diagram illustrating an example of modification processing executed by the generation section 27 on the registered images. The generation section 27 executes various types of modification processing on the registered images according to the specified content of the additional information, such as blurring, background elimination, warping, processing to add highlights, processing according to the weather or ambient lighting, processing to give the characteristics of a distinctive camera such as a toy camera, pop art styling, comic book styling, and vintage styling.

At step S40, the generation section 27 extracts from each image the feature amount $\hat{a}$ of the modified image generated by the processing of step S30 using the BRISK method, and the feature amount $\hat{b}$ of the reproduction of the registered image stored in the memory 204 by the processing of step S20.

The generation section 27 then calculates the L2 distance $dL_2$ ($\hat{a}$, $\hat{b}$) indicating the extent of similarity between the images according to Equation (1) from the feature amounts $\hat{a}$ of the modified image and the feature amounts $\hat{b}$ of the reproduction of the registered image.

At step S50, determination is made as to whether or not the L2 distance $dL_2$ ($\hat{a}$, $\hat{b}$) calculated by the processing of step S40 is greater than the similarity determination threshold value S1 acquired by the processing of step S10, namely, whether or not the modified image is dissimilar to the registered image.

Herein, similarity between a modified image and a registered image denotes that even by using the modified image, determination precision is still only obtained at an equivalent level to the determination precision when the registered image prior to the modification processing is used to determine whether or not the product A is included in a captured image posted to the SNS. As described above, sometimes the image capture conditions for the captured image posted to the SNS differ, and various types of image processing are applied to the captured image. Therefore determination as to whether or not the product A is included in the captured image cannot be made with high precision with modified images that are similar to the registered images but do not take these issues into consideration.

Thus, when the determination of the current step is a negative determination, namely, when the modified image and the registered image are similar, processing transitions to step S60. Then, at step S60, the generation section 27 further executes modification processing according to the content of the additional information on the modified image generated by the processing of step S30, and generates a modified image in which the extent of modification is increased compared to the modified image generated by the processing of step S30. Processing then transitions to step S40, and the generation section 27 repeats the processing of step S40 to step S60 to generate a modified image having a feature amount differing from the feature amounts of the registered images by more than the similarity determination threshold value S1.

However, processing transitions to step S70 when affirmative determination is made by the determination processing of step S50. At step S70, the provision section 22 saves the modified image determined by the determination processing of step S50 to be dissimilar to the registered images as a determination-use image in a predetermined region in the memory 204.

This thereby completes the determination-use image generation processing.

When additional information is not appended to the registered images received in the processing of step S20, the generation section 27 may perform predetermined modification processing according to the general features common to the type of the product A on the registered images. For example, if the product A is a canned drink, considering that the registered images will generally be depicted on the side face of a cylinder, and that it is rare to have situations in which imaging captures the whole of the registered images, modification processing may be executed to give missing portions of the registered images.

In the processing of step S30 modification processing is executed on the registered images based on the content of the additional information associated with the registered images. However, pre-processing that executes predetermined modification processing such as background elimination may be performed on the registered images, and modification processing based on the content of the additional information may be executed on the registered images after finishing pre-processing. The modification processing executed by the pre-processing is not limited to background elimination. For example, modification processing may be performed that causes the feature amounts of the registered images to be extracted more accurately than in cases in which pre-processing is not performed.

Figure 8:
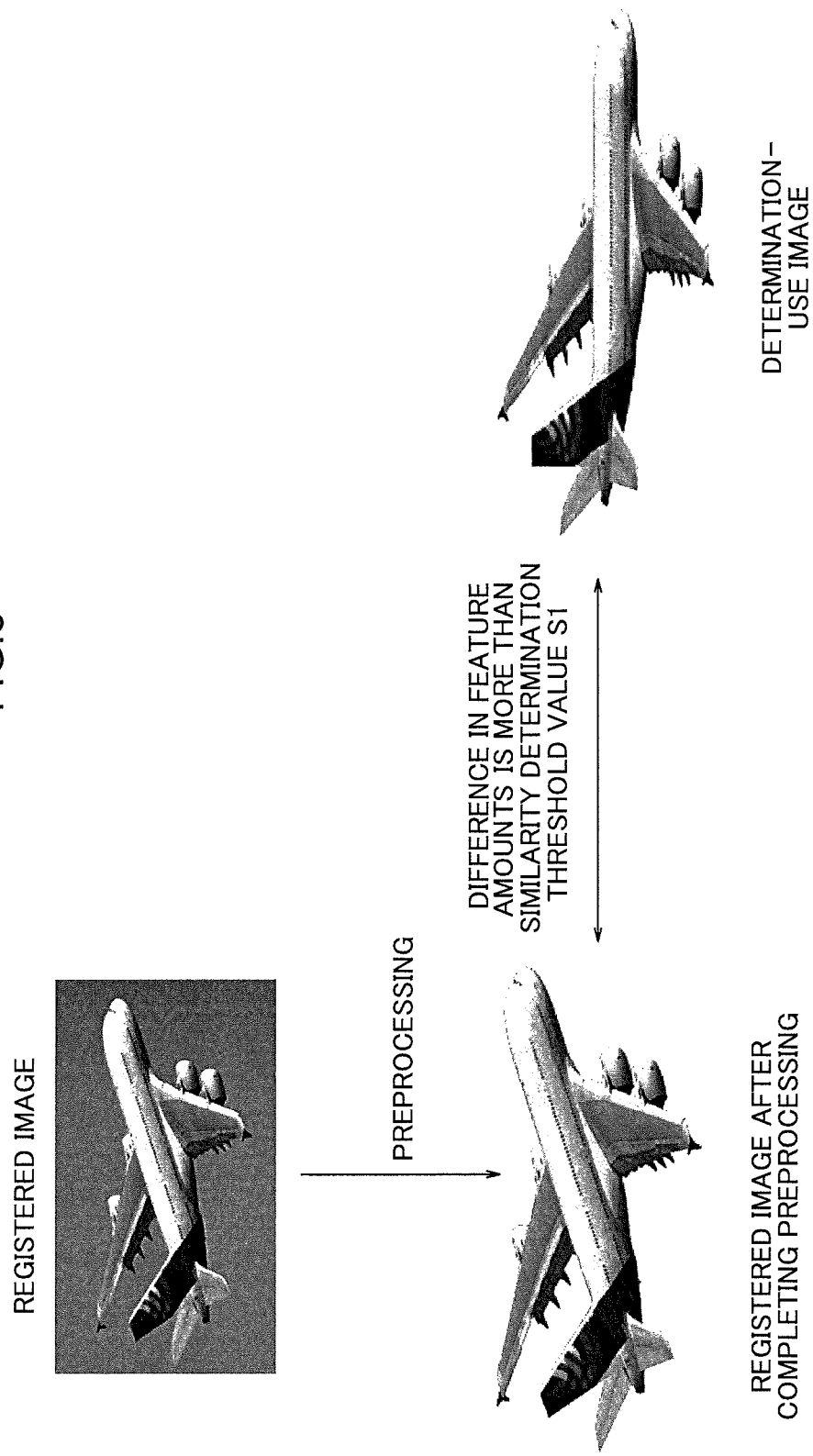
FIG. 8 is a diagram illustrating an example of modification processing.

FIG. 8 is a diagram illustrating an example of a flow that generates a determination-use image after pre-processing has been performed on a registered image. In the example illustrated in FIG. 8, the background of the registered image depicting a mark of a plane is eliminated by pre-processing, and the determination-use image is generated by executing each type of processing of step S30 onward on the registered image from which the background has been eliminated. However, in the processing of step S50, the image whose feature amount is to be compared against that of the modified image generated by the processing of step S30 is the registered image after pre-processing, rather than the registered image received in the processing of step S20.

In such cases, since temporarily modifying the registered image using the pre-processing sometimes causes the feature amount of the registered image to be more accurately extracted than in cases in which the pre-processing is not performed, the difference in the feature amount to the modified image can be more accurately determined in the determination processing of step S50. Namely, the extent of similarity between registered images and the modified image can be more accurately determined than in cases in which pre-processing is not executed, and modified images that are dissimilar to the registered images can be set as determination-use images. Determination as to whether or not the product A is included in a captured image posted to the SNS can accordingly be determined with higher precision using determination-use images generated in this manner.

Figure 9:
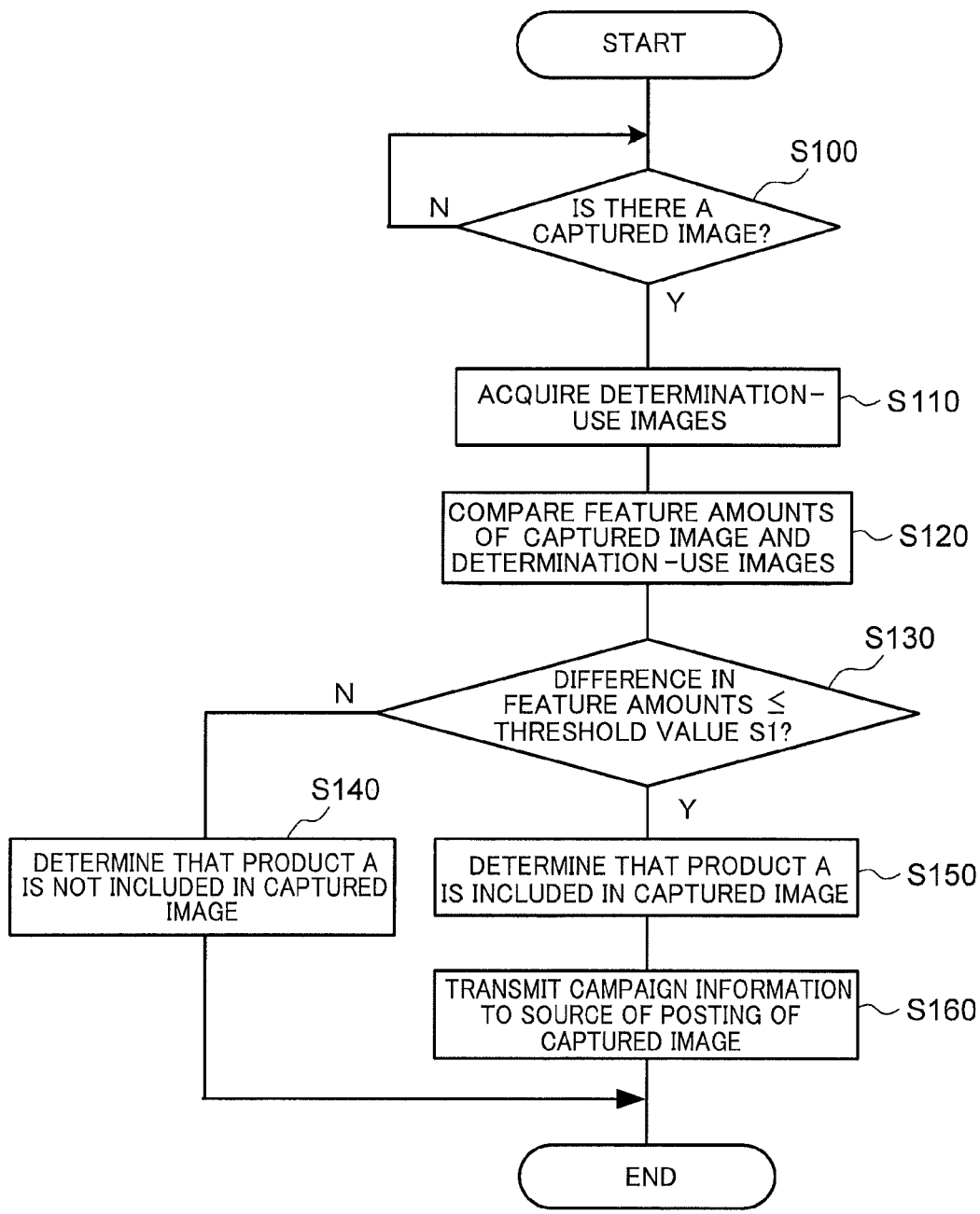
FIG. 9 is flowchart illustrating an example of a flow of determination processing of a service provision system according to a first exemplary embodiment.

FIG. 9 is a flowchart illustrating an example of a flow of determination processing executed by the service provision device 20 during the campaign period for the product A, after the determination-use image generation process as illustrated in FIG. 6 has ended.

First, at step S100, the reception section 25 references the SNS server 40 and determines whether or not there is a captured image posted to the SNS server 40. When negative determination is made, the processing of step S100 is repeated and the SNS server 40 is continuously referenced. In cases of affirmative determination, one of the captured images is acquired from the SNS server 40 and stored in a predetermined region in the memory 204, and processing transitions to step S110. When doing so, the reception section 25 uses an API, provided by the administrator or the like managing the SNS server 40, to acquire identification information uniquely indicating the user who posted the acquired captured image, for example an email address, and stores the identification information in the memory 204 in association with the captured image.

At step S110, the determination section 23 acquires the determination-use images of the product A from the database 24 along with feature amounts of the determination-use images.

At step S120, the determination section 23, for example, performs image matching by scanning the captured images while resizing the determination-use images acquired by the processing of step S110. The determination section 23 then uses the same feature extraction algorithm as the feature extraction algorithm used by the generation section 27 to calculate the feature amounts of the regions of the captured images determined to be most similar to the determination-use images.

The determination section 23 then calculates, for example according to Equation (1), the L2 distance indicating the extent of mutual image similarity from the feature amount of the captured image extracted in the current step and from the feature amounts of the determination-use images acquired by the processing of step S110. Although the L2 distances between the captured images and the determination-use images are calculated here, an indicator of the extent of image similarity may be calculated other than the L2 distance.

Then, at step S130, the determination section 23 acquires the similarity determination threshold value S1 expanded in the memory 204, and determines whether or not the L2 distance calculated at step S120 is the similarity determination threshold value S1 or less. Processing transitions to step S150 when the determination result of the current step is an affirmative determination, namely, when determination is made that there is a region in the captured image similar to a determination-use images for the product A.

At step S150, the determination section 23 determines that an image of the product A is included in the captured image since a portion of the captured image and a determination-use image for the product A are similar to each other.

Then, at step S160, the determination section 23 requests that the output section 26 output an email containing information relating to the campaign for the product A such as a URL link to an application form for a gift to the user who uploaded the captured image. The output section 26 generates the email based on the request from the determination section 23 and outputs the generated email to the email address that was acquired by the processing of step S100 of the user who posted the captured image, and the determination processing illustrated in FIG. 9 ends.

When negative determination is made in the determination processing of step S130, processing transitions to step S140. Then, at step S140, the determination section 23 determines that no image of the product A is included in the captured image, and the determination processing illustrated in FIG. 9 ends.

The determination processing illustrated in FIG. 9 is repeatedly executed during the campaign period for the product A.

As a result of the determination processing, the user that received the email from the service provision device 20 may, for example, obtain a reward such as a gift from the drinks manufacturer by accessing the URL in the email and inputting the mandatory information into the application form.

Although an email is sent to the user who posted the captured image each time determination is made that an image of the product A is included in a captured image in the determination processing illustrated in FIG. 9, the timing at which the email is sent is not limited thereto. For example, the email may be saved in the memory 204, and the email may be sent to the user who posted the captured image after the campaign period for the product A ends.

Moreover, the service provision device 20 may output information identifying the determination result made by the determination section 23 and the provision source of the captured image to the service request terminal 50 of the drinks manufacturer implementing the campaign for the product A. In such cases, customer information for the product A may be collected by the drinks manufacturer using the SNS.

In this manner, based on the additional information including the color, size, outline shape, material, usage, and the like of the product A, the service provision device 20 according to the present exemplary embodiment is able to generate a determination-use image according to the tendency of image capture conditions of the product A included in the captured image, and the tendency to perform image processing on the captured image. Moreover, even when there is no additional information, determination-use images can be generated according to the tendency of the image capture conditions of the product A included in the captured image, and the tendency to perform image processing on the captured image, by executing predetermined modification processing on the registered images according to general features common to the type of the product A. Moreover, the determination-use images are subjected to modification processing such that the feature amounts differ from the feature amounts of the registered images by more than the similarity determination threshold value S1. Accordingly, determination as to whether or not the product A is included in a captured image can be made with higher precision than in cases in which registered images are employed as determination-use image as they are without performing modification processing.

Second Exemplary Embodiment

Next, explanation follows regarding a second exemplary embodiment. The service provision system according to the second exemplary embodiment is similar to the service provision system 10 according to the first exemplary embodiment illustrated in FIG. 2. The service provision system according to the second exemplary embodiment can therefore by implemented by a similar computer system to the computer system 100 according to the first exemplary embodiment illustrated in FIG. 5.

However, the service provision device 20 of FIG. 2 is read as a service provision device 20A, the generation section 27 of FIG. 2 is read as a generation section 27A, the determination section 23 of FIG. 2 is read as a determination section 23A, and the provision section 22 of FIG. 2 is read as a provision section 22A. Moreover, the computer 200 of FIG. 5 is read as a computer 200A, the provision process 222 of FIG. 5 is read as a provision process 222A, the determination process 224 of FIG. 5 is read as a determination process 224A, and the service provision program 218 of FIG. 5 is read as a service provision program 218A.

Herein, the same reference numerals are allocated to portions corresponding to those of the first exemplary embodiment, and explanation focuses on the portions that differ from the first exemplary embodiment.

According to the present exemplary embodiment, in addition to the additional information described in the first exemplary embodiment, the service provision device 20A also receives 3D model data of the product A appended to the registered images from the service request terminal 50. The service provision device 20 then forms a 3D model of the product A based on the 3D model data, and generates modified images in which the registered images are affixed to the formed 3D model.

The generation section 27A therefore includes known algorithms for generation of the 3D model and for performing image processing on the 3D model, such as rotation, and other processing.

Figure 10:
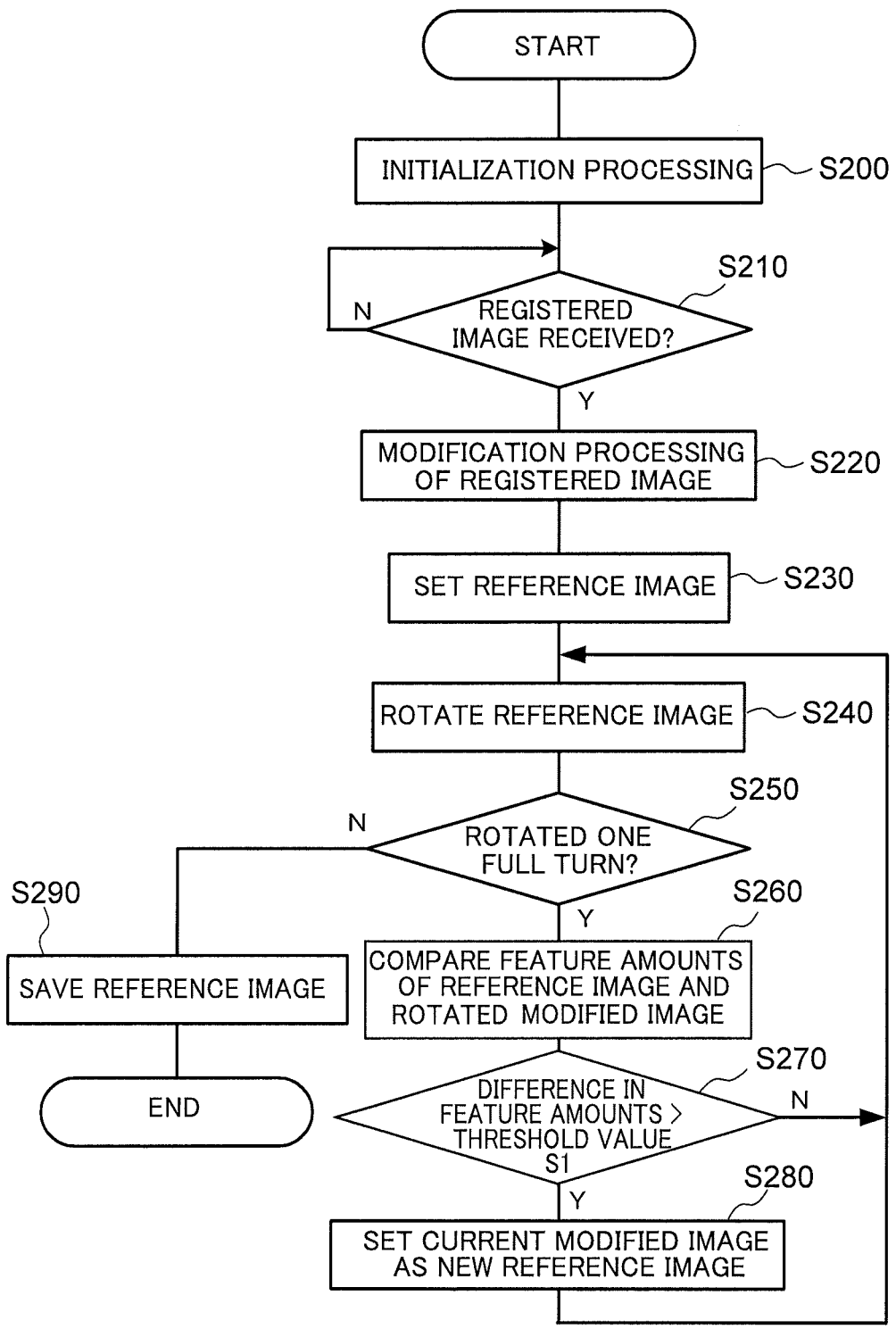
FIG. 10 is a flowchart illustrating an example of a flow of determination-use image generation processing of a service provision system according to a second exemplary embodiment.

Next, explanation follows regarding operation of the service provision device 20A according to the present exemplary embodiment. The service provision device 20A according to the present exemplary embodiment executes the determination-use image generation processing when determination-use images for the product A are not stored in the database 24. FIG. 10 is a flowchart illustrating an example of a flow of determination-use image generation processing according to the present exemplary embodiment.

First, at step S200, initialization processing needed to execute the determination-use image generation processing is executed. Specifically, the generation section 27A acquires the similarity determination threshold value S1 expanded in to the memory 204.

At step S210, the reception section 25 determines whether or not the registered images of the product A and the additional information including the 3D model data of the product A were received from service request terminal 50. In cases of negative determination, the processing of step S210 is repeated until the registered images and the additional information are received. In cases of affirmative determination, the registered images received from the reception section 25 are saved in a predetermined region in the memory 204, and the registered images and the additional information are associated with each other and stored in a predetermined region in the memory 204.

At step S220, the generation section 27A forms the 3D model of the product A from the 3D model received by the processing of step S210. The generation section 27A then performs image processing to affix the registered images received by the processing of step S210 over the surface of the formed 3D model formed of the product A. The position where the registered images are affixed on the 3D model may, for example, be specified as additional information from the service request terminal 50. The generation section 27A then generates, as modified images, images when the 3D model is viewed from predetermined positions.

Figure 11:
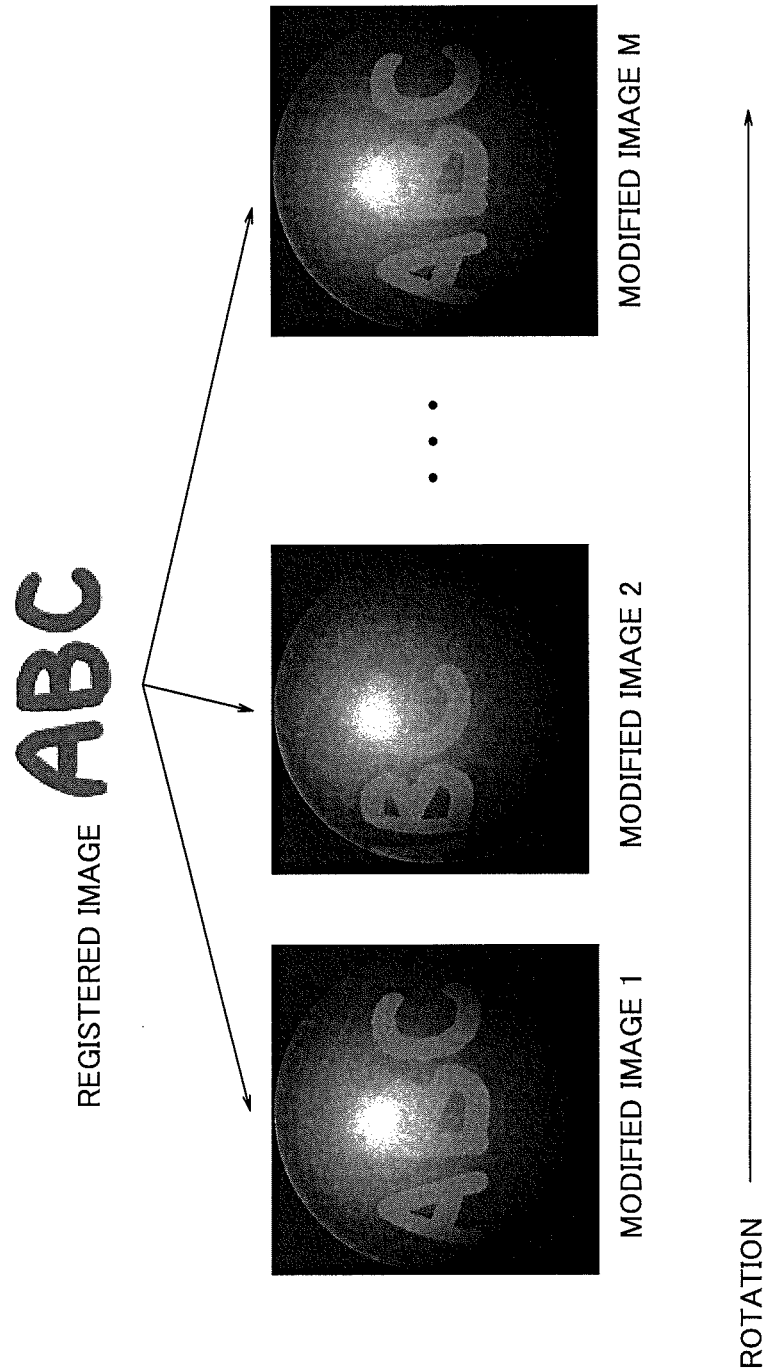
FIG. 11 is a diagram illustrating an example of modification processing that rotates a 3D model of a product.

A modified image 1 illustrated in FIG. 11 is an image illustrating an example of a modified image generated by the current step. The modified image 1 illustrated in FIG. 11 represents a modified image in which the mark "ABC", which is a registered image, is affixed to the surface of a 3D model representing a sphere.

At step S230, the generation section 27A saves the modified images generated at step S220 to a predetermined region of the memory 204 as reference images.

Then, at step S240, the generation section 27A rotates the 3D model by a predetermined amount in any direction and generates, as a modified image, an image of the 3D model, as viewed from the same position as the position from which the 3D model was viewed in the processing of step S220. The rotation direction and rotation amount of the 3D model may, for example, be specified as additional information from the service request terminal 50, and when not specified in the additional information, the generation section 27A may rotate the 3D model in a predetermined direction by a predetermined rotation amount.

Although the rotation amount of the modified image is not particularly limited, it is preferable to set the rotation amount as small as possible since this enables more modified images to be generated.

A modified image 2 illustrated in FIG. 11, is a modified image generated by rotating the 3D model corresponding to modified image 1 toward the left side of the drawing. The display position of the registered image "ABC" changes with the rotation of the 3D model, since position from which the 3D model is viewed is fixed.

At step S250, the generation section 27A determines whether or not the 3D model has been rotated one full turn from the position corresponding to the reference image set by the processing of step S230. The generation section 27A can determine whether or not the 3D model has rotated a full turn based on the cumulative rotation amount from the position corresponding to the reference image set by the processing of step S230. A modified image M illustrated in FIG. 11 is a modified image representing a state after the 3D model has rotated a full turn. Processing transitions to step S260 when the determination processing of the current step makes a negative determination.

At step S260, the generation section 27A acquires the feature amounts ^a of the rotated modified images generated by the processing of step S240, and the feature amounts ^b of the currently set reference images, using, for example, the BRISK method.

The generation section 27A then calculates the L2 distance $dL_2$ (^a, ^b) representing the extent of similarity between images, for example according to Equation (1), from the feature amounts ^a of the rotated modified images and the feature amounts ^b of the reference images.

At step S270, the generation section 27A determines whether or not the L2 distance $dL_2$ (^a, ^b) calculated at step S260 is greater than the similarity determination threshold value S1 acquired by the processing of step S200, namely, determines whether or not the rotated modified image is dissimilar to the reference image. Similarity between the rotated modified image and the reference image means that the rotated modified image generated by the processing of step S240 can be determined as being the product A when the existing reference images are employed.

Accordingly, when negative determination is made, namely, when the rotated modified image and the reference image are similar, processing transitions to step S240 without setting the current rotated modified image as a new reference image.

However, processing transitions to step S280 when the affirmative determination has been made by the determination processing of step 270. The rotated modified image being dissimilar to the reference image means that the feature amounts of the product A is not able to be extracted from the rotated modified image representing the product A from a different angle, even though the image depicts the same product A.

Thus at step S280, instead of just the existing reference images, the generation section 27A sets the rotated modified image determined as being dissimilar to the existing reference images as a new reference image, and processing transitions to step S240. The processing of step S240 to step S280 is then repeated to generate reference images of the product A in which the feature amounts of the images mutually differ by more than the similarity determination threshold value S1, while rotating the 3D model of the product A.

Processing transitions to step S290 when the determination processing of step S250 makes an affirmative determination, namely, when the 3D model of the product A has rotated a full turn.

At step S290, the provision section 22A saves all of the reference images generated by the generation section 27A in the processing of step S230 and step S280 in a predetermined region of the memory 204, as determination-use images. There will then be at least one or more determination-use images present since a reference image is generated by the processing of step S230.

This thereby completes the determination-use image generation processing.

In this manner, the determination-use image generation processing according to the present exemplary embodiment is able to generate determination-use images simulating the product A as viewed from plural angles by rotating the 3D model. Moreover, the number of determination-use images can be reduced since the determination-use images are dissimilar to one another.

In the determination-use image generation processing according to the present exemplary embodiment, an example has been given in which the 3D model is rotated in one direction; however, determination-use images may be generated in which the product A is viewed from plural direction while rotating the 3D model in various directions. Such cases obtain determination-use images in which the product A is displayed from various angles, thereby enabling determination-use images to be generated in which captured images including the product A are extracted with higher precision than when the determination-use images generated by rotating the 3D model in one direction.

In the determination-use image generation processing according to the present exemplary embodiment, images of the whole of the 3D model of the product A affixed with the registered image are generated as determination-use images; however, just the registered images on which modification processing has been executed to give the different display angles that accompany rotation of a 3D model may be generated as determination-use images.

However, employing images of the 3D model of the product A as determination-use images enables determination to be made as to whether or not the product A is included in a captured image from not only the mark of the product A, but also from the shape of the product A. This accordingly enables determination as to whether or not the product A that is the determination subject is included in a captured image posted to the SNS to be made with higher precision than when just the registered images on the 3D model are employed as the determination-use images.

Similarly to the processing of step S30 of the first exemplary embodiment illustrated in FIG. 6, in the processing of step S220 of the determination-use image generation processing according to the present exemplary embodiment, modification processing may be performed on the 3D model of the product A affixed with the registered image according to the content of the additional information.

Figure 12:
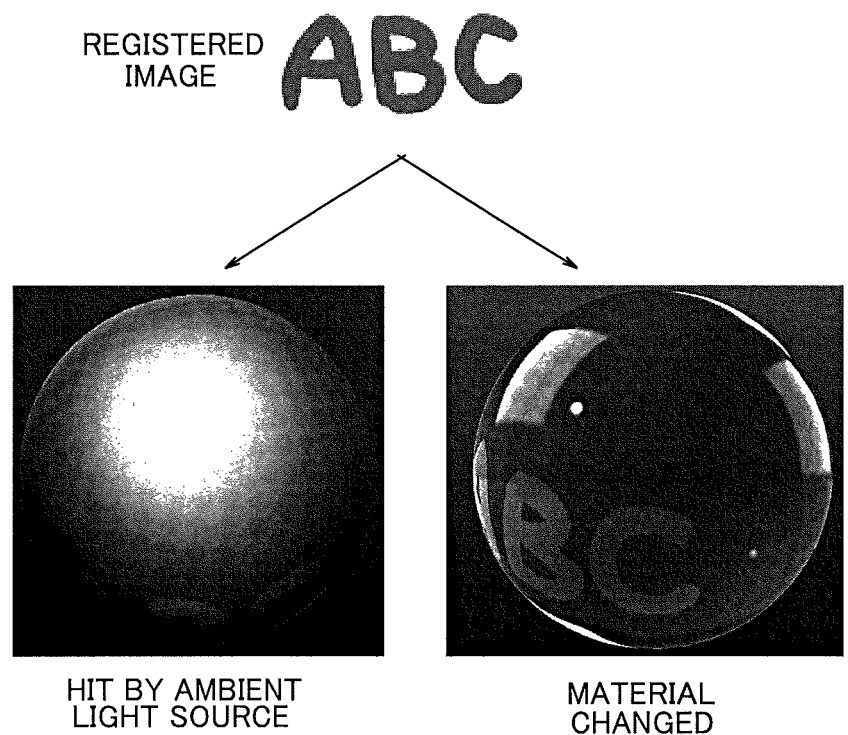
FIG. 12 is a diagram illustrating an example of modification processing performed on a 3D model of a product.

FIG. 12 is a diagram illustrating an example of modification processing performed on the 3D model of the product A affixed with the registered image. As illustrated in FIG. 12, for example, modification may be made for an ambient light source of a specified type hitting the 3D model from a position specified by the additional information, modifying the impression of the surface of the 3D model according to the material specified by the additional information. Modified images of the product A on which such modification processing has been executed enable determination-use images to be generated that extract the product A included in a captured image with higher precision, since they are more similar to images of the product A included in the captured images.

In the determination-use image generation processing according to the present exemplary embodiment, at the processing of step S280 the reference images for comparison with the rotated modified image are successively updated when the difference that is the distance between the feature amounts of the rotated modified image and feature amounts of the reference image are greater than the similarity determination threshold value S1. However, the determination-use images may be generated by each time comparing against the reference images set by the processing of step S230, without updating the reference images being compared to the rotated modified images.

In such cases, in the processing of step S280, the generation section 27A, for example, stores rotated modified images determined to not be similar to the existing reference images in the memory 204. The generation section 27A then changes the value of the similarity determination threshold value S1 employed in the determination processing of step S70 each time the processing of step S80 is executed. For example, if the value of similarity determination threshold value S1 is provisionally set as K for generating determination-use images with image feature amounts that different from one another by more than similarity determination threshold value S1, each time the processing of step S280 is executed, the value of the similarity determination threshold value S1 may be changed in the sequence K, (K×2), (K×3), and so on.

The provision section 22A may then, in the processing of step S290, set the reference images set by the processing of step S30 and the rotated modified images saved in the memory 204 by the processing of step S280 as determination-use images.

An example has been given in the determination-use image generation processing according to the present exemplary embodiment in which 3D model data of the product A is received from the service request terminal 50. However, the 3D model data may be pre-prepared by the service provision device 20A, and the 3D model data to be employed may be selected from the service request terminal 50. Such cases enable a reduction in the effort by the manufacturer to prepare the 3D model data of the product A.

In the determination-use image generation processing according to the present exemplary embodiment, the generation section 27A rotates the 3D model and generates the determination-use images of the product A viewed from plural angles after generating the 3D model of the product A affixed with the registered image. However, the method of generating determination-use images of the product A viewed from plural angles is not limited thereto.

For example, real-time images may be received that have been sent from a terminal (image capture terminal) installed with a dedicated application provided by the administrator that manages the service provision device 20, and captured while moving through one turn around the periphery of the product A. Note that the dedicated application may include a function that sends images from during image capture to the service provision device 20 in real-time, and, for example, the service request terminal 50 may be employed as the image capture terminal. A video may be configured to include plural frames appended with frame numbers in ascending time-sequence order of capture of the real-time images, and by assembling the images corresponding to each of the frames.

In such cases the reception section 25 receives instructions from the image capture terminal for image capture start and image capture end, and starts acquisition of the real-time images according to the instruction to start image capture. Then, after setting as a reference image the image of FRAME 1 acquired from the real-time images, the generation section 27A acquires images of FRAME 2 onward in sequence one frame at a time, and compares the feature amounts of images of the acquired frames against the feature amounts of the reference image. The generation section 27A then sets the image of the acquired frame as a new reference image if the feature amounts differ from each other by more than the similarity determination threshold value S1. After this, the generation section 27A may determine the difference in feature amounts between the image of the next acquired frame and the new reference image, and repeatedly execute processing to extract new reference images from the real-time images until an instruction to end image capture is received. The provision section 22A then provides each of the reference images obtained in this manner as determination-use images.

The generation section 27A may compare the feature amounts of each of the frame images after executing the specified modification processing on each frame image according to the additional information.

FIG. 13 is a flowchart illustrating an example of a flow of determination processing executed during the campaign period for the product A by the service provision device 20 after the determination-use image generation processing illustrated in FIG. 10 has ended.

First, at step S300, the reception section 25 references the SNS server 40 and determines whether or not there is a captured image posted to the SNS server 40 by a user. The processing of step S300 is repeated and the SNS server 40 is continuously referenced in cases of negative determination. In cases of affirmative determination, the captured images are acquired from the SNS server 40 and stored in a predetermined region in the memory 204, and processing transitions to step S310. When doing so, the reception section 25 uses an API, provided by the administrator or the like managing the SNS server 40, to acquire identification information uniquely indicating the user who posted the acquired captured image, for example an email address, and stores the identification information in the memory 204 in association with the captured image.

At step S310, the determination section 23A determines whether or not there are any determination-use images not yet acquired from the determination-use images of the product A stored in the database 24, and processing transitions to step S330 when affirmative determination is made.

At step S330, the determination section 23A acquires a determination-use image not yet acquired from the database 24 along with a feature amount of the determination-use image.

Then, at step S340, the determination section 23A, for example, performs image matching by scanning the captured images received in the processing of step S300 while resizing the determination-use images acquired by the processing of step S330. The determination section 23A then uses the same feature extraction algorithm as the feature extraction algorithm used by the generation section 27A to calculate the feature amounts of the regions of the captured images determined to be most similar to the determination-use images.

The determination section 23A then calculates, for example according to Equation (1), the L2 distance indicating the extent of mutual image similarity from the feature amounts of the captured image calculated in the current step and from the feature amounts of the determination-use images acquired by the processing of step S330.

At step S350, the determination section 23A acquires the similarity determination threshold value S1 expanded in the memory 204, and determines whether or not the L2 distance calculated at step S340 is the similarity determination threshold value S1 or less. In cases of affirmative determination, namely, cases in which determination is made that there are no regions in the captured image similar to the determination-use images of the product A, processing transitions to step S310, and the processing that determines whether or not there is a region in the captured images similar to another determination-use image of the product A is repeated. Processing transitions to step S360 when the determination result of the current step is an affirmative determination, namely, when determination is made that there is a region in the captured image similar to a determination-use image for the product A.

At step S360, the determination section 23A determines that the product A is included in the captured image since a portion of the captured image and a determination-use image for the product A are similar to each other.

Then, at step S370, the determination section 23A requests that the output section 26 output an email containing information relating to the campaign for the product A, such as a URL link to an application form for a gift, to the user who uploaded the captured image. The output section 26 generates the email based on the request from the determination section 23A and outputs the generated email to the email address that was acquired by the processing at step S300 of the user who posted the captured image, and the determination processing illustrated in FIG. 13 ends.

When negative determination is made in the determination processing of step S310, namely, when determination is made that there are no regions in the captured image similar to any of the determination-use images for the product A, processing transitions to step S320. Then, at step S320, the determination section 23A determines that the product A is not included in the captured image, and the determination processing illustrated in FIG. 13 ends.

In this manner, in the determination processing according to the present exemplary embodiment, determination processing is executed using determination-use images of the product A displayed from plural angles generated by the determination-use image generation processing illustrated in FIG. 10. Accordingly, determination as to whether or not the product A subject to determination is included in a captured image can be made with higher precision than when determination processing is executed using a determination-use image displayed from a single angle.

Although explanation of technology disclosed herein has been given above using exemplary embodiments, technology disclosed herein is not limited to the scope of the exemplary embodiments above. Various modifications and improvements may be made to the exemplary embodiments above within a range not departing from the spirit of technology disclosed herein, and the technological scope of technology disclosed herein also encompasses modes in which such modifications and improvements have been made. For example, the processing sequence may be modified within a range not departing from the spirit of technology disclosed herein.

Although explanation has been given of exemplary embodiments in which the service provision programs 218, 218A are pre-stored (pre-installed) on the storage section 206, there is not limitation thereto. The service provision programs according to technology disclosed herein may also be provided in a format recorded on a computer readable recording medium. For example, the service provision programs according to technology disclosed herein may also be provided in a format recorded on a portable recording medium such as a CD-ROM, a DVD-ROM, or USB memory. The service provision programs according to technology disclosed herein may also be provided in a format recorded on, for example, semiconductor memory such as flash memory.

In the first exemplary embodiment and the second exemplary embodiment, explanation has been given regarding an example in which the service provision devices 20, 20A are applied to a sales promotion campaign for a product using the SNS, and determination is made as to whether or not the product that is the campaign subject is included in images posted to the SNS.

However, the areas of application of the service provision devices 20, 20A are not limited to this example.

For example, the service provision devices 20, 20A may be employed in a marketing service utilizing the images posted to the SNS.

To simplify the explanation below, explanation is given of an example situation in which the service provision device 20 employs a marketing service. However, the service provision device 20A may also be applied in a similar situation.

First, the service provision device 20 executes the determination-use image generation processing illustrated in FIG. 6, and generates a determination-use image for the product (product subject to analysis) that is the subject of the marketing service. Note that there may be plural products subject to analysis, and determination-use images are generated for each of the products subject to analysis in such cases.

The service provision device 20 then acquires the captured image posted to the SNS server 40, and determines whether or not the product subject to analysis is included in captured image by executing the determination processing illustrated in FIG. 9.

When the product subject to analysis is included into the captured image, information related to when the product subject to analysis was imaged is also acquired in addition to the captured image. The content of the related information acquired is not limited, and includes information acquirable from the captured image.

For example, the related information may include the number of products subject to analysis included in the captured image, the ratio of the area occupied by products subject to analysis with respect to the size of the captured image, the image capture environment indicating whether the image capture location was indoors or outdoors, the weather at the time of image capture, and the like. Moreover, the type of processing for treating the captured image may be acquired, such as sepia toning such that an image exhibits the impression of passage of time, or styling as an illustration. Moreover, information may be acquired that indicates the number of people depicted with the product subject to analysis, their estimated ages, and whether they are smiling or angry, and information related to fashion that indicates whether they are formally dressed or casually dressed.

The relation information may also include information related to the image matching executed by the processing of step S120 illustrated in FIG. 9 and step S340 illustrated in FIG. 13. The information related to the image matching is, for example, information indicating which location of the captured image was scaled resized and by what extent, and to which determination-use image it was determined to be similar.

Then, based on the acquired related information related to the product subject to analysis, the service provision device 20, for example, performs analysis of information indicating who tends to use the product subject to analysis, and when and where they tend to use it, with this information being valuable in sales promotion of the product subject to analysis and the like. The analysis results are then sent to the service request terminal 50 of the manufacturer that requested the marking service.

When this is performed, the service provision device 20 may send the related information to the service request terminal 50 along with the analysis results. Moreover, the related information acquired from the captured images may be sent to the service request terminal 50 alone, and analysis based on the related information may implemented in the service request terminal 50.

When the product subject to analysis is analyzed based on the related information, the service provision device 20 may analyze a combination of other information such as text posted to the SNS server 40 together with the captured image, and marking data related to the product subject to analysis provided by the manufacturer.

In this manner, the service provision device 20 is able to provide the manufacturer with information related to sales promotion of the product.

Explanation follows regarding an example situation in which the service provision devices 20, 20A are employed in an active support service employing the images posted to the SNS. The active support service includes, for example, a service that analyzes images that include the product, and forwards images that are images for analysis that give a favorable reaction to many people, namely, images likely to prove popular, and thereby increases favorable feelings toward the manufacturer by users.

The active support service determines whether or not the product subject to active support (the product subject to support) is included in the captured image by a method similar to that of the marking service described above.

When the product subject to support is included in the captured image, analysis is made as to whether or not the captured image is likely to be a popular image. In this analysis, for example, analysis is performed using plural evaluation items such as the feelings of people depicted in the captured image, the presence of absence of animals, and the content of any modification processing performed on the captured image, and sets a score for each evaluation item. For example, captured images in which the depicted people are laughing are set with a higher score than those in which the people are angry. The scores for each evaluation item are then summed, and captured images with a predetermined score or greater are determined to be images likely to be popular.

In such cases, captured images likely to be popular out of images depicting the product of the manufacturer that requested the active support service can be spread across the internet. This enables the service provision device 20 to provide the manufacture with a service for increasing the favorable feelings toward the manufacturer by users.

Explanation has been given in the exemplary embodiments of cases in which the service provision devices 20, 20A are implemented by single computers 200, 200A. However, the processes may be executed by different computers, and the service provision devices 20, 20A may be implemented by respective computers connected by the communication line 60, in a distributed processing configuration.

In such cases, the provision processes 222, 222A provide the determination-use images over the communication line 60 to the computers that execute the determination processes 224, 224A, respectively.

Although the captured images are acquired from the SNS server 40 in each exemplary embodiment, the acquisition source of the captured images is not limited to the SNS server 40, and may be a server where users of an unspecified large number of user terminals 30 connected to the communication line 60 publish captured images, such as a message board or home page.

Although the first exemplary embodiment and the second exemplary embodiment adopt modes in which the registered images are received from the manufacturer, a request may be received from the manufacturer, and the registered images may be prepared by the service provider that manages the service provision devices 20, 20A.

As described above, software capable of conveniently executing various types of processing and correction on captured images is provided to information devices such as smartphones, and the occurrence of captured images in which processing such as elimination of the background of the captured image is increasing.

Conventionally, the appearance of a subject included in captured images changes according to image capture conditions during image capture of the subject, such as the angle and exposure amount, and image processing performed on the captured image, even though the captured images are of the same subject, and the subject is sometimes mis-recognized as not being included in a captured image.

One aspect of technology disclosed herein exhibits an advantage effect of enabling determination as to whether or not a subject is included in a captured image to be made with higher precision.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a program that causes a computer to execute a process, the process comprising:

generating a modified image by executing modification processing on an image indicating a predetermined mark affixed to a product body, wherein a feature amount of the modified image differs from a feature amount of the image of the predetermined mark or another modified image by more than a specified reference amount;

providing the generated modified image as a determination-use image to determine whether a product affixed with the predetermined mark is included in a captured image; and detecting the product affixed with the mark from the captured image using the determination-use image.

2. The non-transitory recording medium of claim 1, wherein the feature amount of the modified image differs from the feature amount of the image of the predetermined mark by more than the specified reference amount.

3. The non-transitory recording medium of claim 2, wherein the process further comprises:
receiving information that determines a content of the modification processing, and generating the modified image based on the received information.

4. The non-transitory recording medium of claim 3, wherein the information is information that identifies the shape of the product affixed with the mark.

5. The non-transitory recording medium of claim 3, wherein the information is information that identifies a material of the product affixed with the mark.

6. The non-transitory recording medium of claim 3, wherein the information is information identifying a type of ambient light source illuminating the product affixed with the mark.

7. The non-transitory recording medium of claim 3, wherein the information is information indicating a content of image processing executed on the image of the mark.

8. The non-transitory recording medium of claim 1, wherein the feature amount of the modified image differs from a feature amount of a second modified image of the mark by more than a specific reference amount.

9. The non-transitory recording medium of claim 1, wherein the captured image is an image acquired from the Internet.

10. A non-transitory recording medium storing a program that causes a computer to execute a process, the process comprising:
storing, in a memory, a modified image obtained by executing modification processing on an image indicating a predetermined mark affixed to a product body, wherein a feature amount of the modified image differs from a feature amount of the image of the predetermined mark or another modified image by more than a specified reference amount;
using the modified image stored in the memory to determine whether a product affixed with the predetermined mark is included in an acquired captured image;
detecting the product affixed with the mark from the acquired captured image using the modified image stored in the memory.

11. The non-transitory recording medium of claim 10, wherein the process further comprises:
identifying a provision source of the captured image when, as a result of the determination, determination has been made that the product affixed with the mark is included in the captured image; and
outputting a message to the identified provision source.

12. The non-transitory recording medium of claim 11, wherein the process further comprises:
outputting information that identifies the provision source of the captured image when, as a result of the determination, determination has been made that the product affixed with the mark is included in the captured image.

13. A non-transitory recording medium storing a program that causes a computer to execute a process, the process comprising:
receiving information that determines a content of modification processing;
generating a modified image based on the received information by executing the determined modification processing on an image indicating a predetermined mark affixed to a product body; and
providing the generated modified image as a determination-use image to determine whether a product affixed with the predetermined mark is included in a captured image; and
wherein a feature amount of the modified image differs from a feature amount of the image of the predetermined mark or another modified image by more than a specified reference amount,
wherein the information is information related to a 3D model of the product affixed with the mark, and the process further comprises:
employing, as the modified image based on the information, respective reference images obtained by repeating processing that sets a reference image as a reference from images of the mark affixed to the 3D model, that rotates the 3D model of the product affixed with the mark, that acquires an image of the mark at an angle at which the feature amount of the modified image differs from a feature amount of the reference image by more than the specified reference amount, and that sets the acquired image of the mark as a new reference image, further rotates the 3D model of the product affixed with the mark, and acquires an image of the mark at an angle at which a feature amount of the new reference image differs by more than the specified reference amount.

14. A non-transitory recording medium storing a program that causes a computer to execute a process, the process comprising:
receiving information that determines a content of modification processing;
generating a modified image based on the received information by executing the determined modification processing on an image indicating a predetermined mark affixed to a product body; and
providing the generated modified image as a determination-use image to determine whether a product affixed with the predetermined mark is included in a captured image; and
wherein a feature amount of the modified image differs from a feature amount of the image of the predetermined mark or another modified image by more than a specified reference amount,
wherein the information is information related to a 3D model of the product affixed with the mark, and the process further comprises:
employing, as the modified image based on the information, respective reference images obtained by repeating processing that sets a reference image as a reference from images of the 3D model of the product affixed with the mark, that rotates the 3D model of the product affixed with the mark, that acquires an image of the 3D model affixed with the mark at an angle at which the feature amount of the modified image differs from a feature amount of the reference image by more than the specified reference amount, that sets the acquired image of the 3D model of the product affixed with the mark as a new reference image, that further rotates the 3D model of the product affixed with the mark, and that acquires an image the 3D model of the product affixed with the mark at an angle at which the feature amount differs from a feature amount of the new reference image by more than the specified reference amount.

* * * * *